United States Patent
Barone et al.

(10) Patent No.: US 8,442,499 B2
(45) Date of Patent: *May 14, 2013

(54) METHODS AND APPARATUS FOR OVER-THE-AIR SUBSCRIPTIONS

(75) Inventors: Joseph Barone, San Diego, CA (US); An Mei Chen, San Diego, CA (US); Ravinder Paul Chandhok, Poway, CA (US); Gordon Kent Walker, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/553,660

(22) Filed: Sep. 3, 2009

(65) Prior Publication Data

US 2009/0323593 A1 Dec. 31, 2009

Related U.S. Application Data

(62) Division of application No. 11/139,130, filed on May 27, 2005, now Pat. No. 7,603,109.

(60) Provisional application No. 60/660,609, filed on Mar. 10, 2005.

(51) Int. Cl.
*H04M 3/42* (2006.01)

(52) U.S. Cl.
USPC .............. 455/414.1; 455/414.2; 455/422.1; 370/328; 370/338

(58) Field of Classification Search .............. 455/414.1, 455/414.3, 422.1; 370/328, 338
See application file for complete search history.

(56) References Cited

U.S. PATENT DOCUMENTS

| | | | |
|---|---|---|---|
| 6,494,762 B1 | 12/2002 | Bushmitch et al. | |
| 6,577,614 B1 | 6/2003 | Cook et al. | |
| 6,622,017 B1 | 9/2003 | Hoffman | |
| 6,999,763 B2 | 2/2006 | Ramalho et al. | |
| 7,024,557 B1 | 4/2006 | Moles et al. | |
| 7,269,629 B2 | 9/2007 | Zmudzinski et al. | |
| 7,319,888 B2* | 1/2008 | Li et al. ........................ | 455/562.1 |
| 7,603,109 B2* | 10/2009 | Barone et al. ................ | 455/414.1 |
| 7,606,918 B2 | 10/2009 | Holzman et al. | |
| 2002/0037723 A1 | 3/2002 | Roach | |

(Continued)

FOREIGN PATENT DOCUMENTS

| EP | 0955737 A2 | 11/1999 |
|---|---|---|
| JP | 2000231530 A | 8/2000 |

(Continued)

OTHER PUBLICATIONS

International Search Report, PCT/US2006/008796, International Searching Authority, European Patent Office, Jul. 11, 2006.

(Continued)

*Primary Examiner* — Nghi H Ly (74) *Attorney, Agent, or Firm* — Fulbright & Jaworski L.L.P.

(57) ABSTRACT

Methods and apparatus for over-the-air (OTA) subscriptions. A method is provided for performing over-the-air subscriptions in a data network. The method comprises establishing an overhead notification mechanism, and transmitting a package database to a device using the overhead notification mechanism, wherein the package database identifies one or more service packages. The method also comprises receiving a request from the device to subscribe to one or more selected service packages.

34 Claims, 6 Drawing Sheets

U.S. PATENT DOCUMENTS

| | | | |
|---|---|---|---|
| 2002/0086683 A1 | 7/2002 | Kohar et al. | |
| 2003/0065738 A1 | 4/2003 | Yang et al. | |
| 2003/0186704 A1 | 10/2003 | Tamura et al. | |
| 2003/0235147 A1 | 12/2003 | Walton et al. | |
| 2004/0058651 A1 | 3/2004 | Ross et al. | |
| 2004/0072557 A1 | 4/2004 | Palla et al. | |
| 2004/0102182 A1 | 5/2004 | Reith et al. | |
| 2004/0127205 A1 | 7/2004 | Mahajan | |
| 2004/0266440 A1* | 12/2004 | Fuchs et al. | 455/445 |
| 2005/0065801 A1 | 3/2005 | Poikselka et al. | |
| 2005/0090235 A1 | 4/2005 | Vermola et al. | |
| 2006/0253596 A1 | 11/2006 | Barone et al. | |
| 2007/0027961 A1 | 2/2007 | Holzer | |

FOREIGN PATENT DOCUMENTS

| | | |
|---|---|---|
| JP | 2001308932 A | 11/2001 |
| JP | 2002007260 A | 1/2002 |
| JP | 2002056304 | 2/2002 |
| JP | 2002182768 A | 6/2002 |
| JP | 2002374567 A | 12/2002 |
| JP | 200376635 | 3/2003 |
| JP | 2003085084 | 3/2003 |
| JP | 2003115796 | 4/2003 |
| JP | 2003523101 | 7/2003 |
| JP | 2003283422 A | 10/2003 |
| JP | 2003333182 | 11/2003 |
| JP | 2004088741 | 3/2004 |
| KR | 1020010067324 | 7/2001 |
| KR | 20030089364 A | 11/2003 |
| TW | 532001 | 5/2003 |
| WO | WO9966747 A2 | 12/1999 |
| WO | 02078316 | 10/2002 |
| WO | WO02103514 A2 | 12/2002 |
| WO | 03032664 | 4/2003 |
| WO | WO2004030389 A1 | 4/2004 |
| WO | WO2004036941 | 4/2004 |
| WO | WO2006121862 A2 | 11/2006 |

OTHER PUBLICATIONS

Written Opinion, PCT/US2006/008796, International Searching Authority, European Patent Office, Jul. 11, 2006.

International Preliminary Report on Patentability, PCT/US2006/008796, International Bureau of WIPO, Geneva, Switzerland, Sep. 12, 2007.

Rusu et al., "Planarization of deep trenches," Proc. SPICE, 2001, 4557, 49-57.

European Search Report—EP09177265—Search Authority—Munich—Dec. 17, 2009.

Taiwan Search Report—TW095108012—TIPO—Aug. 28, 2012.

* cited by examiner

| FIELD | SIZE |
| --- | --- |
| Version | 1 byte |
| Maximum_version | 1 byte |
| Minimum_version | 1 byte |
| System_protocol | 1 byte |
| Message_flags | 1 byte |
| Time_stamp | 4 bytes |
| Network_Type | 1 byte |
| Device_ID | VARIABLE |
| Subscriber_ID | VARIABLE |
| Signature | VARIABLE |
| Overhead_information | VARIABLE |

FIG. 6

| FIELD | SIZE |
| --- | --- |
| Number of Packages | 1 byte |
| Package_ID | 8 byte |
| Package_version | 2 byte |
| Package_ID | 8 byte |
| Package_version | 2 byte |
| ⋮ | |

FIG. 7

METHODS AND APPARATUS FOR OVER-THE-AIR SUBSCRIPTIONS

CLAIM OF PRIORITY UNDER 35 U.S.C. §119

The present application for patent is a divisional application which claims priority to U.S. patent application Ser. No. 11/139,130, issued as U.S. Pat. No. 7,603,103 on Oct. 13, 2009, entitled "METHODS AND APPARATUS FOR OVER-THE-AIR SUBSCRIPTION", filed May 27, 2005 which claims priority to Provisional Application No. 60/660,609 entitled "MEDIAFLO OVER THE AIR SUBSCRIPTION", filed Mar. 10, 2005, and assigned to the assignee hereof and hereby expressly incorporated by reference herein.

REFERENCE TO CO-PENDING APPLICATIONS FOR PATENT

The present application for patent is related to the following co-pending U.S. patent applications:

"METHODS AND APPARATUS FOR SIMULTANEOUSLY HOSTING MULTIPLE SERVICE PROVIDERS ON A NETWORK" U.S. patent application Ser. No. 11/139,302, published as U.S. patent application Pub. No. 2006/0253596 on Nov. 9, 2006, having Ser. No. PCT/US06/17415, filed concurrently herewith, assigned to the assignee hereof, and expressly incorporated by reference herein.

I. FIELD

The present invention relates generally to content subscriptions in a network environment, and more particularly, to methods and apparatus for providing over-the-air subscriptions.

II. BACKGROUND

Data networks, such as wireless communication networks, have to trade off between services customized for a single terminal and services provided to a large number of terminals. For example, the overhead required to provide services to one or a few terminals may not be significant, however, the overhead required to provide those same services to a large number of terminals may be significant and consume a substantial amount of network resources. Thus, the distribution of content to a large number of mobile terminals (subscribers) is a complicated problem. This is especially true for mobile terminals that communicate using relatively slow speed over-the-air communication links as opposed to much faster hardwired connections generally used by devices having fixed locations. Therefore, it is very important for network administrators and content providers to have a way that allows mobile terminals to easily and efficiently subscribe to receive content and/or other network services.

In current content delivery/media distribution systems, subscriptions are typically handled over the Internet via one or more customer sign-up pages, or as in traditional cable and satellite systems, via a telephone call made by the customer to a customer service representative. The Web page model may even offer one or more pages that can be accessed from or specifically formatted (i.e., WML, XHTML) for presentation on a mobile device. However, this approach is essentially just a variation of the Internet sign-up page model.

Typically, Web page subscription services provide server driven request/response systems. For example, a user is presented with screen after screen of various forms that must be filled out and submitted to a network server. Thus, the system is presentation layer dependent, since the various forms are formatted and stored at the server, and the subscribing device need only render those forms for the device user to fill out. As a result, the server generally needs to provide forms that have been formatted for the rendering resource available on the subscribing device. In some cases, the server provides the correctly formatted forms, and in other cases, the server directs the device to an alternative site or server to retrieve the correctly formatted forms. Therefore, whether the device is a desktop computer or a mobile computing device, the same server driven request/response system is provided with the forms reformatted for the rendering capabilities of the subscribing device.

Unfortunately, current systems do not provide a fast and efficient way for a mobile device, such as a mobile terminal, to subscribe to one or more service packages. For example, a device user first needs to launch a data session with a service provider in order to view the service offerings. After selecting an offering for subscription, the user needs to complete one or more forms that are downloaded from the server and rendered on the device. Generally, because the forms are formatted for rendering on a relatively small screen available on the portable device, multiple forms need to be completed. Furthermore, because the entire process is conducted over-the-air, the relatively low transmission speeds make the subscription process very slow. Therefore, as a result of the slow and tedious subscription process currently available, portable device users may avoid subscriptions altogether, or if they do use the system, may be dissatisfied with its response and efficiency.

Therefore, what is needed is an over-the-air subscription system that allows users of mobile devices to easily subscribe to one or more service packages. The system should operate to avoid the problems associated with presentation layer subscription services, so that device users may quickly and efficiently subscribe to receive available services using slower over-the-air transmission speeds.

SUMMARY

In one or more embodiments, an over-the-air (OTA) subscription system is provided that allows a mobile device to subscribe for services from a content distribution system using a wireless communication link. In one embodiment, the system provides an application protocol through which a secure OTA subscription request can be generated directly from a device. The system comprises a device-resident client that maintains a database of available service packages so that the device user can easily browse and select from the available packages. As a result, the user need not launch a data session with an external server in order to browse the service offerings. In one embodiment, the systems implements a unique device-to-server subscription protocol that is presentation layer independent and allows an authenticated device to subscribe to selected service packages. Since the device is authenticated, all subscription requests can be signed, and therefore the system provides a secure subscription environment.

In one embodiment, a method is provided for performing over-the-air subscriptions in a data network. The method comprises establishing an overhead notification mechanism, and transmitting a package database to a device using the overhead notification mechanism, wherein the package database identifies one or more service packages. The method also comprises receiving a request from the device to subscribe to a selected service, apparatus is provided for overthe-air subscriptions in a data network. The apparatus comprises overhead notification logic that operates to establish an overhead notification channel. The apparatus also comprises transmitting logic that operates to transmit a package database to a device using the overhead notification channel, wherein the package database identifies one or more service packages. The apparatus also comprises receiving logic that operates to receive a request from the device to subscribe to a selected service package In one embodiment, a method is provided for performing over-the-air subscriptions in a data network. The method comprises establishing an overhead notification mechanism, and transmitting a package database to a device using the overhead notification mechanism, wherein the package database identifies one or more service packages. The method also comprises receiving a request from the device to subscribe to a selected service.

In one embodiment, apparatus is provided for over-the-air subscriptions in a data network. The apparatus comprises overhead notification logic that operates to establish an overhead notification channel. The apparatus also comprises transmitting logic that operates to transmit a package database to a device using the overhead notification channel, wherein the package database identifies one or more service packages. The apparatus also comprises receiving logic that operates to receive a request from the device to subscribe to a selected service package.

In one embodiment, apparatus is provided for over-the-air subscriptions in a data network. The apparatus comprises means for establishing an overhead notification mechanism. The apparatus also comprises means for transmitting a package database to a device using the overhead notification mechanism, wherein the package database identifies one or more service packages. The apparatus also comprises means for receiving a request from the device to subscribe to a selected service package.

In one embodiment, a computer-readable media is provided that comprises instructions, which when executed by a processor, operate to provide over-the-air subscriptions in a data network. The computer-readable media comprises instructions for establishing an overhead notification channel. The computer-readable media also comprises instructions for transmitting a package database to a device using the overhead notification channel, wherein the package database identifies one or more service packages. The computer-readable media also comprises instructions for receiving a request from the device to subscribe to a selected service package.

In one embodiment, a method is provided for operating a device to perform over-the-air subscriptions in a data network. The method comprises establishing an overhead notification mechanism, and receiving a package database using the overhead notification mechanism, wherein the package database identifies one or more service packages. The method also comprises transmitting a request over-the-air to subscribe to a selected service package.

In one embodiment, apparatus is provided for performing over-the-air subscriptions in a data network. The apparatus comprises overhead notification logic that operates to establish an overhead notification channel. The apparatus also comprises receiving logic that operates to receive a package database from a content server using the overhead notification channel, wherein the package database identifies one or more service packages. The apparatus also comprises transmitting logic that operates to transmit a request over-the-air to subscribe to a selected service package.

In one embodiment, apparatus is provided for performing over-the-air subscriptions in a data network. The apparatus comprises means for establishing an overhead notification mechanism, and means for receiving a package database from a content server using the overhead notification mechanism, wherein the package database identifies one or more service packages. The apparatus also comprises means for transmitting a request over-the-air to subscribe to a selected service package.

In one embodiment, a computer-readable media is provided that comprises instructions, which when executed by a processor, operate to perform over-the-air subscriptions in a data network. The computer-readable media comprises instructions for establishing an overhead notification mechanism, and instructions for receiving a package database from a content server using the overhead notification mechanism, wherein the package database identifies one or more service packages. The computer-readable media also comprises instructions for transmitting a request over-the-air to subscribe to a selected service package.

Other aspects, advantages, and features of the present invention will become apparent after review of the hereinafter set forth Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes one or more embodiments of an OTA subscription system. The system is especially well suited for use in wireless networks environments, but may be used in any type of network environment, including but not limited to, communication networks, public networks, such as the Internet, private networks, such as virtual private networks (VPN), local area networks, wide area networks, long haul network, or any other type of data network.

The following definitions are used herein to describe one or more embodiments of the OTA subscription system.

Service A service is a sequence of media presentations and may represent the smallest element that may be subscribed to in the subscription system.

Tier A tier is a collection of one or more services.

Package A package (or "Service Package") is a collection of one or more tiers that are offered on a subscription basis.

In one or more embodiments, the OTA subscription system provides a device-resident client that presents the device user with a program guide (PG) that contains a viewable list of available service packages, which are locally cached on the device. When the device user selects a package for subscription, the client generates a request for a subscription using a Device-to-Server Subscription Protocol (DSSP). The subscription protocol supports subscriptions to one or more service packages in each request, and the requests are digitally signed to guarantee that they originated from an authenticated device. The subscription request is transmitted to a content server that processes the request to subscribe the service package to the device. Thus, the device user is able to efficiently subscribe over-the-air to one or more service packages in a manner that conserves network resources and reduces the required overhead.

Figure 1:
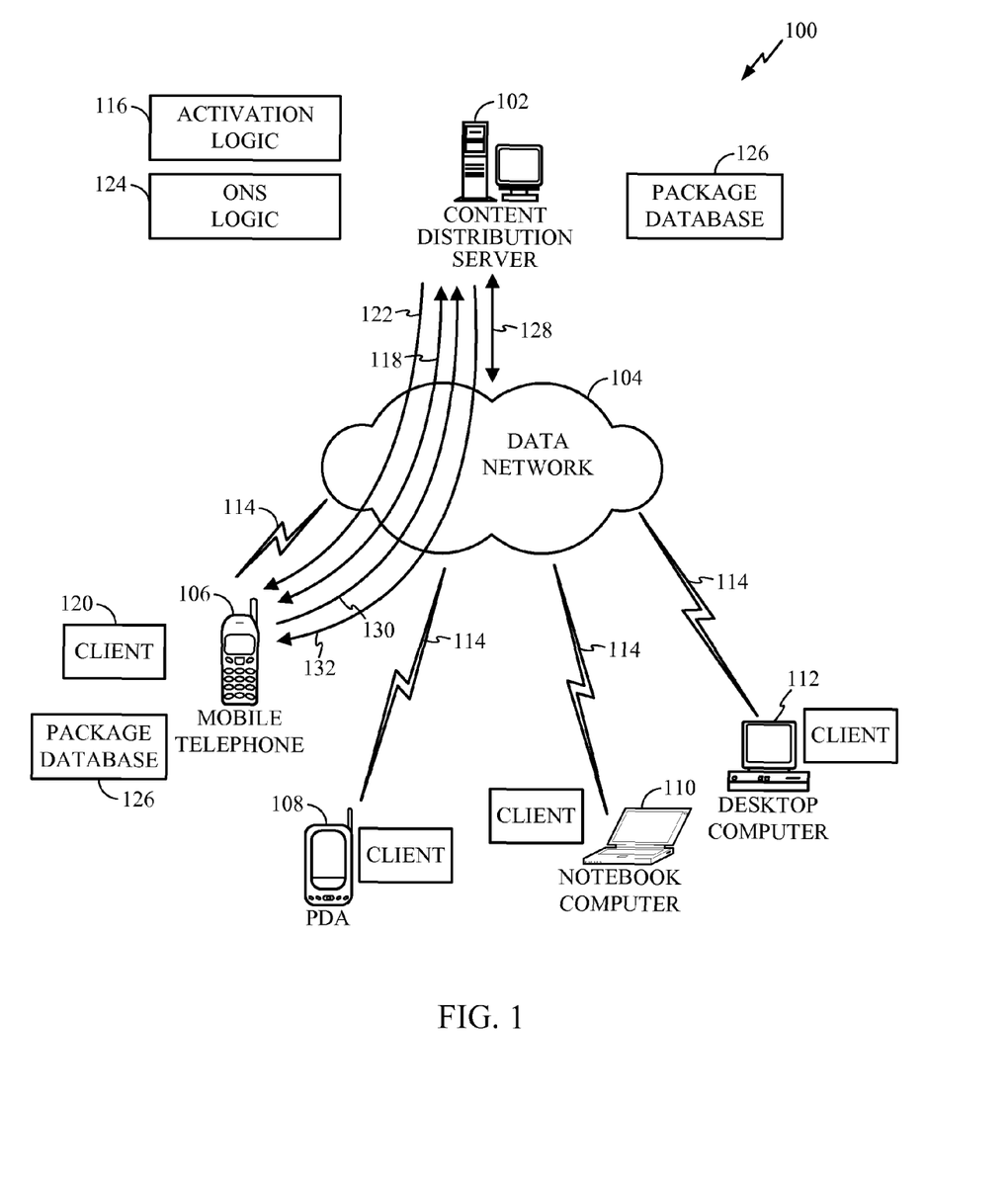
FIG. 1 shows a network that comprises one embodiment of an OTA subscription system.

FIG. 1 shows a network 100 that comprises one embodiment of an OTA subscription system. The network 100 comprises a content distribution server 102, a data network 104, and a collection of devices that comprise a mobile telephone 106, a personal digital assistant (PDA) 108, a notebook computer 110 and a desktop computer 112. The data network 104 may be any type and/or combination of wired and/or wireless networks that allow data to be transmitted between the server 102 and the devices. The server 102 communicates with the network 104 via the communication link 128, which may comprise any type of wired or wireless communication channel. The data network 104 provides wireless communication links 114 that allow data to be wirelessly transmitted between the network 104 and the devices 106, 108, 110, and 112. The wireless communication links 114 comprise any type of wireless communication technology. For the remainder of this description, various embodiments of the OTA subscription system will be described with reference to the mobile telephone 106. However, the embodiments are equally applicable to the devices 108, 110, and 112.

In one embodiment, an overhead notification mechanism is used to establish communications between the server 102 and the device 106. For example, the device 102 communicates with overhead notification logic 124 at the server 102 to establish an overhead channel (ONC) 122. The ONC 122 may be a virtual channel that is part of an existing communication channel between the server 102 and the device 106. However, in one or more embodiments, it is possible for the ONC 122 to be implemented as any type of communication channel between the server 102 and the device 106.

In one embodiment, the system comprises a client program 120 that is resident on the device 106. For example, the client program may be downloaded to the device 106 from the server 102 via the ONC 122. In another embodiment, the client program 120 is loaded into the device during device manufacture. In still another embodiment, the client program 120 is downloaded into the device 106 from a third-party system or network entity.

Once installed on the device 106, the client program 120 operates to activate the device 106 so that that device 106 may acquire OTA subscriptions. In one embodiment, the client program 120 securely exchanges identification and other information with the activation logic 116 (as shown by path 118) in order to activate the device 106 for operation with the OTA subscription system. After the device 106 is activated, the server 102 downloads a package database 126 to the device 106 via the ONC 122.

The package database 126 describes service packages that are available for subscription by the device 106. During operation of the device 106, the client 120 allows a device user to instantly review service packages that are available for subscription. Because the database is maintained on the device 106, the device 106 does not need to launch a data session with an external server in order for the device user to browse the service offerings. The client program 120 operates to provide a program guide that is displayed on the device 106. The device user may then select one or more service packages, to which subscriptions may be acquired.

To subscribe to the service packages selected by the device user, the client 120 utilizes a device-to-server protocol to generate a subscription request that is transmitted to the server 102. For example, the client 120 sends a subscription request to the server 102, as shown at 130. The subscription request requests that the server 102 subscribe the device 106 to the selected service packages. After processing the request, the server 102 provides the subscribed content to the device 106, as shown by path 132. In other embodiments, the subscribed content is delivered to the device from a third party content provider.

In one or more embodiments, the OTA subscription system operates to maintain the latest updates to the package database 126 at the device 106. For example, the client 120 transmits information to the server 102 pertaining to the current revision of the package database 126. If an updated version of the package database 126 is available at the server 102, the server 102 transmits an updated package database to the device 106 via the ONC 122. Since transmission on the ONC 122 are performed in the background and are transparent to the device user, the client operates to maintain the most up to date copy of the package database 126 at the device without any user intervention.

In one or more embodiments, the package database 126 may be in any suitable format and/or data type. For example, each package identified in the database 126 may include a package identifier, package description, listing of services, pricing information, scheduling, and any other relevant information. The client 120 operates to present any or all of the available information in the package database 126 to the user of the device 106 via the program guide. Thus, it is possible for the device user to see a variety of information with which to select one or more service packages for subscription. In one or more embodiments, activation of the device 106 and information transmitted over the ONC 122 are protected using any secure authentication mechanism.

In one embodiment, the system also operates to allow the device 106 to unsubscribe or terminate any currently existing subscription. For example, the client 120 displays service packages currently subscribed to by the device. The device user selects one or more packages for which subscriptions are to be cancelled or terminated. The client 120 assembles a termination request, which is similar to a subscription request. The termination requests that the server unsubscribe the device from the identified service packages. Using the device-to-server protocol, the client 120 transmits the termination request to the server 102. The server 102 then processes the request to terminate the identified subscriptions.

Figure 2:
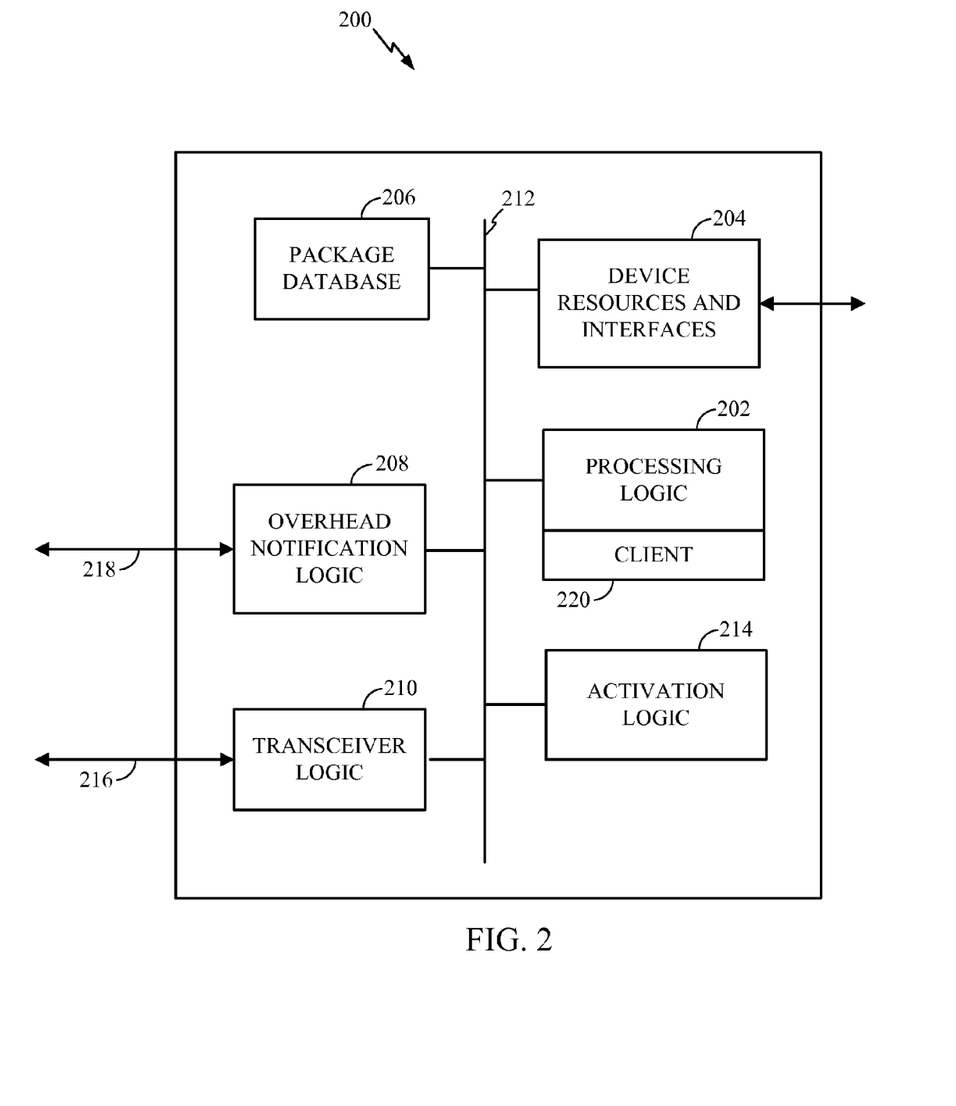
FIG. 2 shows a detailed diagram of one embodiment of a content server suitable for use in one or more embodiments of an OTA subscription system.

FIG. 2 shows a detailed diagram of one embodiment of a content server 200 suitable for use in one or more embodiments of an OTA subscription system. For example, the server 200 may be used as the server 102 in FIG. 1. The server 200 comprises processing logic 202, device resources 204, package database 206, overhead notification logic 208, and transceiver logic 210, all coupled to an internal data bus 212. The server 200 also comprises activation logic 214, which is also coupled to the data bus 212.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions and to control one or more other functional elements of the server 200 via the internal data bus 212.

The device resources and interfaces 204 comprise hardware and/or software that allow the server 200 to communicate with internal and external systems. For example, internal systems may include mass storage systems, memory, display driver, modem, or other internal device resources. The external systems may include user interface devices, printers, disk drives, or other local devices or systems.

The package database 206 comprises any type of memory device suitable for storing information about available service packages. For example, the package database 206 may comprise information such as package identifiers, service or tier identifiers, scheduling information, pricing, and/or any other type of information relevant to available service packages.

The transceiver logic 210 comprises hardware and/or software that operates to allow the server 200 to transmit and receive data and/or other information with remote devices or systems via communication channel 216. For example, in one embodiment, the communication channel 216 comprises any suitable type of communication link to allow the server 200 to communicate with a data network.

The overhead notification logic 208 comprises hardware and/or software that operates to allow the server 200 to establish and communicate over an ONC 218. The ONC 218 allows the server 200 to communicate in the background with a device. For example, in one embodiment, the ONC 218 comprises a wireless link to a device that allows data to be transmitted to the device. In one embodiment, the overhead notification logic 208 is used to transparently transmit information from the package database 206 to a device. In one embodiment, the overhead notification logic 208 is part of the transceiver logic 210, and the ONC 218 is part of the communication channel 216.

The processing logic 202 comprises a client program 220 that may be downloaded to the device. For example, the client 220 may be downloaded to the device using the ONC 218. The client 220 comprises a program, executable, data file or any other type of file suitable for execution on a device to provide one or more embodiments of an OTA subscription system.

The activation logic 214 comprises a CPU, processor, gate array, hardware logic, memory elements, virtual machine, software, and/or any combination of hardware and software. The activation logic 214 operates to activate a device to operate with the OTA subscription system. The activation process need only occur once for each device that desires to use the OTA subscription system. In one embodiment, the client program 220 runs on the device and communicates with the activation logic 214 to activate the device. Once a device is activated, the client program 220 running on the device operates to receive and display information about available service packages to the device user. Thus, the activation logic 214 operates in real-time to allow the server 200 to know who a device is, how to invoice the device, authenticate the device, and download a service package database to the device for rendering by the client 220.

In one embodiment, the OTA subscription system comprises program instructions stored on a computer-readable media, which when executed by a processor, for instance, the processing logic 202, provides the functions of the server 200 described herein. For example, instructions may be loaded into the server 200 from a computer-readable media, such as a floppy disk, CDROM, memory card, FLASH memory device, RAM, ROM, or any other type of memory device or computer-readable media that interfaces to the server 200 via the device resources 204. In another embodiment, the instructions may be downloaded into the server 200 from an external device or network resource that interfaces to the server 200 via the transceiver logic 210. The instructions, when executed by the processing logic 202, provide one or more embodiments of an OTA subscription system as described herein.

Figure 3:
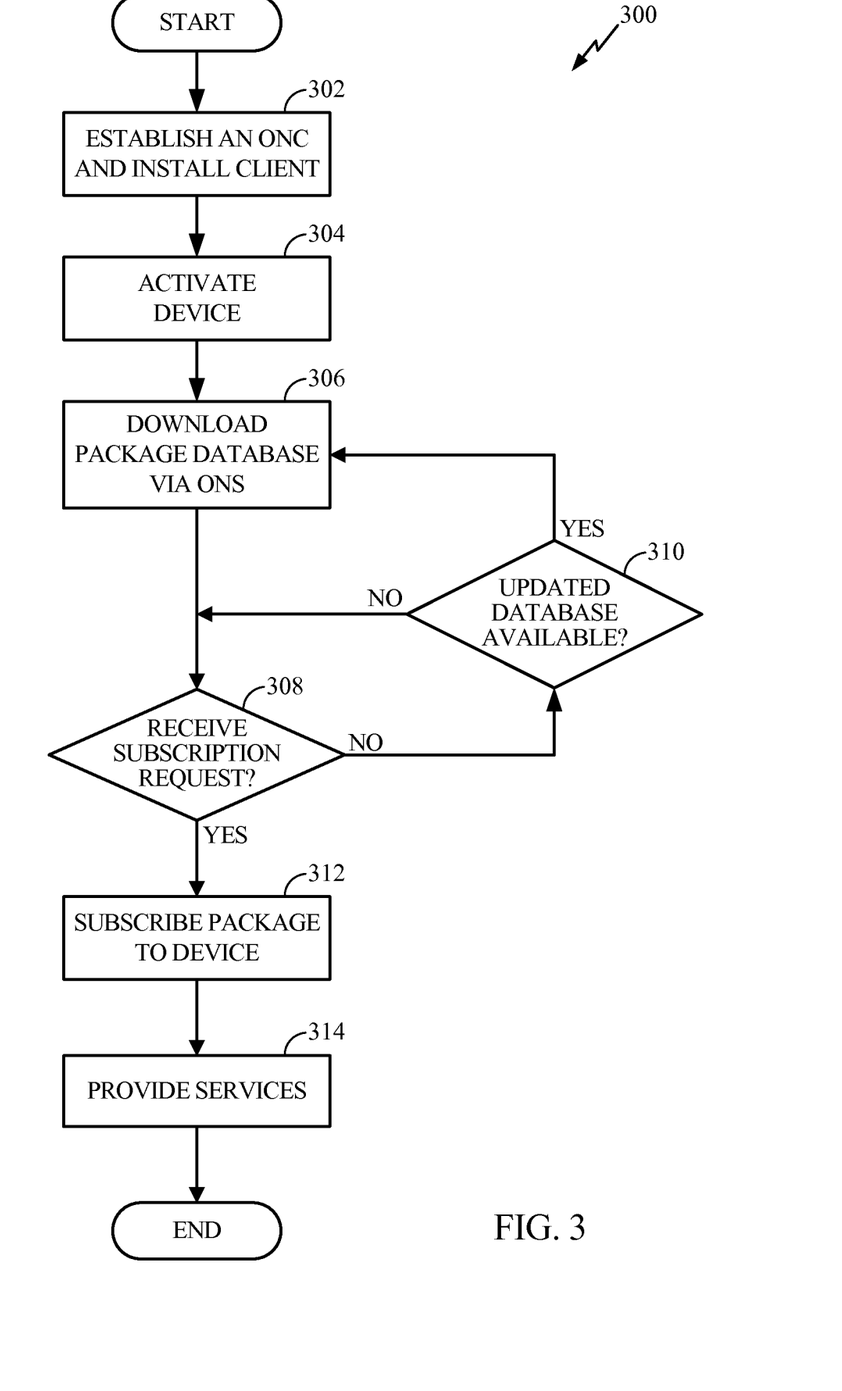
FIG. 3 shows one embodiment of a method for operating a server in one embodiment of an OTA subscription system.

FIG. 3 shows one embodiment of a method 300 for operating a server in one embodiment of an OTA subscription system. For clarity, the method 300 will be described with reference to the server 200 shown in FIG. 2. In one or more embodiments, the processing logic 202 executes program instructions and controls the operation of the server 200 to perform the functions described below.

At block 302, an ONC is established between the server 200 and a device. For example, the overhead notification logic 208 establishes the ONC 218 with the device to allow the client 220 to be downloaded and installed on the device. In another embodiment, the client 220 is downloaded to the device from a third party.

At block 304, the device is activated so that it may subscribe to one or more service packages using one or more embodiments of an OTA subscription system. For example, the client program installed on the device contacts the server 200 to provide the required activation information. In one embodiment, the client program communicates with the processing logic 202 via the transceiver logic 210 to provide secure authenticated information for activation purposes. For example, the information may comprise device identity, user identity, billing information, and any other type of relevant information.

At block 306, a package database is downloaded using the ONC and locally cached on the device. For example, the processing logic 202 controls the overhead notification logic 208 to download the package database 206 to the device using the ONC 218. Thus, the latest version of the package database is transparently downloaded and stored on the device.

At block 308, a test is performed to determine if the device user would like to subscribe to one or more packages available in the package database. For example, the client on the device operates to render a program guide of available packages to the device user. The device user selects one or more packages and the client assembles a subscription request that is transmitted to the server using a device-to-server protocol. The subscription request includes information about the requesting device and the number and types of packages to which the user wishes to subscribe. Thus, if a subscription request is received at the server, the method proceeds to block 312. If a subscription request is not received, the method proceeds to block 310.

At block 310, a test is performed to determine of an update package database is available for transmission to one or more devices. For example, as more service packages become available, the package database 206 is updated with new information to allow devices to subscribe to the newly available packages. For example, the processing logic 202 operates to update the package database 206 with new service package information. If a new package database is available the method proceeds to block 306 where the new package database is transparently downloaded to the device via the ONC 218. If a new package database is not available, the method proceeds to block 308 where the test is performed to determine if a new subscription request has been received.

At block 312, the server has received a new subscription request, which is processed to allow a device to subscribe to one or more service packages. For example the subscription request is transmitted using a device-to-server subscription protocol. The subscription request is received and processed by the processing logic 202 so that the device transmitting the subscription request may subscribe to one or more service packages identified in the request.

At block 314, the requested services that have been subscribed to are provided to the device. For example the server operates to transmit the services, via the transceiver logic 210, to the device via a wireless network connection. In another embodiment, the server operates to authorize a content provider, or other third party service provider, to provide the subscribed services to the device.

It should be noted that the method 300 illustrates just one embodiment and that changes, additions, or rearrangements of the described functions may be made without deviating from the scope of the described embodiments. For example, in one embodiment, the server 200 may operate to terminate or unsubscribe an existing subscription. In this embodiment, the server 200 receives a termination request from the device at block 308. The termination request is a request from the device to unsubscribe or terminate an existing subscription. The server then operates to terminate the subscription at block 312, after which, the method ends.

Figure 4:
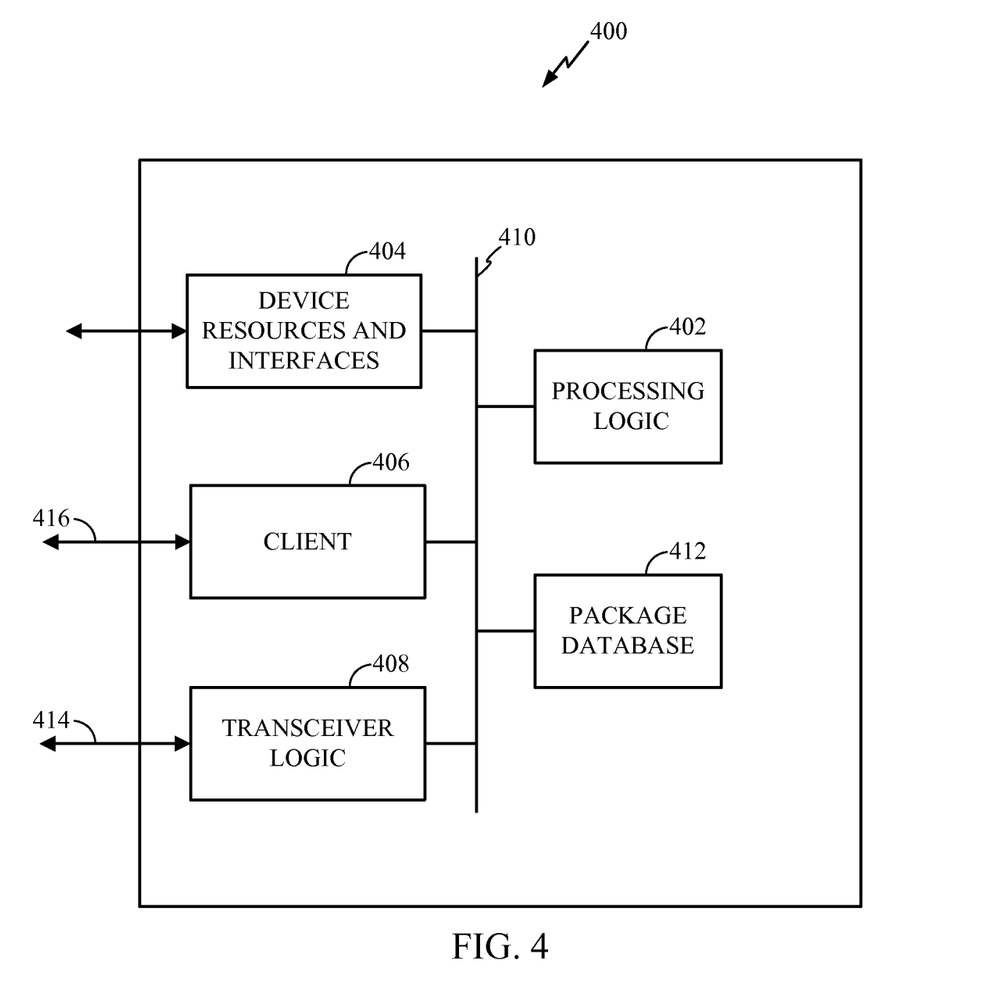
FIG. 4 shows a detailed diagram of one embodiment of a terminal suitable for use in one embodiment of an OTA subscription system.

FIG. 4 shows a detailed diagram of one embodiment of a terminal 400 suitable for use in one embodiment of an OTA subscription system. The terminal 400 comprises processing logic 402, device resources and interfaces 404, and transceiver logic 408, all coupled to a data bus 410. The terminal 400 also comprises a client 406 and a package database 412, which are also coupled to the data bus 410.

In one or more embodiments, the processing logic 402 comprises a CPU, processor, gate array, hardware logic, memory elements, virtual machine, software, and/or any combination of hardware and software. Thus, the processing logic 402 generally comprises logic to execute machine-readable instructions and to control one or more other functional elements of the terminal 400 via the internal data bus 410.

The device resources and interfaces 404 comprise hardware and/or software that allow the terminal 400 to communicate with internal and external systems. For example, internal systems may include mass storage systems, memory, display driver, modem, or other internal device resources. The external systems may include user interface devices, printers, disk drives, or other local devices or systems.

The transceiver logic 408 comprises hardware and/or software that operate to allow the terminal 400 to transmit and receive data and/or other information with external devices or systems via communication channel 414. For example the communication channel 414 may comprise a network communication link, a wireless communication link or any other type of communication link.

During operation, the device 400 is activated to operate using one or more embodiments of an OTA subscription system. In one embodiment, the device establishes an ONC with a content distribution server. The client 406 is downloaded from the server using the ONC 416 and installed on the device. In another embodiment, the client 406 is installed on the device during manufacture, or downloaded from a third party. The client 406 executes on the device to communicate with the content distribution server for the purpose of completing a one-time activation process. During the activation process, the server uses the ONC 416 to download a package database 412 to the device.

Once the activation process is complete, the client 406 operates to provide a user interface (UI) that allows the device user to view the available service packages identified in the package database 412. The client 406 also allows the device user to select one or more packages for subscription. After the device user selects one or more packages for subscription, the selected packages are identified in a subscription request that is generated by the client 406. The client 406 then transmits the subscription request to the content distribution server. In one or more embodiments, the client 406 comprises machine-readable instructions that are executed by the processing logic 402 to perform the functions described herein.

The package database 412 comprises any type of memory suitable for storing information relating to service packages that are available for subscription. For example, the package database 412 may comprise package identifiers, scheduling information, pricing, and/or any other information about the available service packages that may be rendered on the device.

In one embodiment, a device performs one or more of the following functions in one or more embodiments of an OTA subscription system. It should be noted that the following functions may be changed, rearranged, modified, add to, or otherwise adjusted within the scope of the embodiments.

1. An overhead notification mechanism is established between the device and a content server.
2. A client program is downloaded to the device, or currently exists on the device
3. The client activates the device with the OTA subscription system.
4. The device receives a package database from the content server that is transparently transmitted to the device using the overhead notification mechanism.
5. The client renders a program guide to the device user that shows available service packages to which the user may subscribe.
6. After the user selects one or more packages, the client assembles a subscription request that is transmitted to the content server using a device-to-server protocol.
7. After the subscription request has been processed by the content server, the device receives the services for which the user has subscribed.

In one embodiment, the OTA subscription system comprises program instructions stored on a computer-readable media, which when executed by the processing logic 402, provides the functions of the terminal 400 described herein. For example, instructions may be loaded into the terminal 400 from a computer-readable media, such as a floppy disk, CDROM, memory card, FLASH memory device, RAM, ROM, or any other type of memory device or computer-readable media that interfaces to the terminal 400 via the device resources 404. In another embodiment, the instructions may be downloaded into the terminal 400 from a network resource that interfaces to the terminal 400 via the transceiver logic 408. The instructions, when executed by the processing logic 402, provide one or more embodiments of a usage tracking system as described herein.

Figure 5:
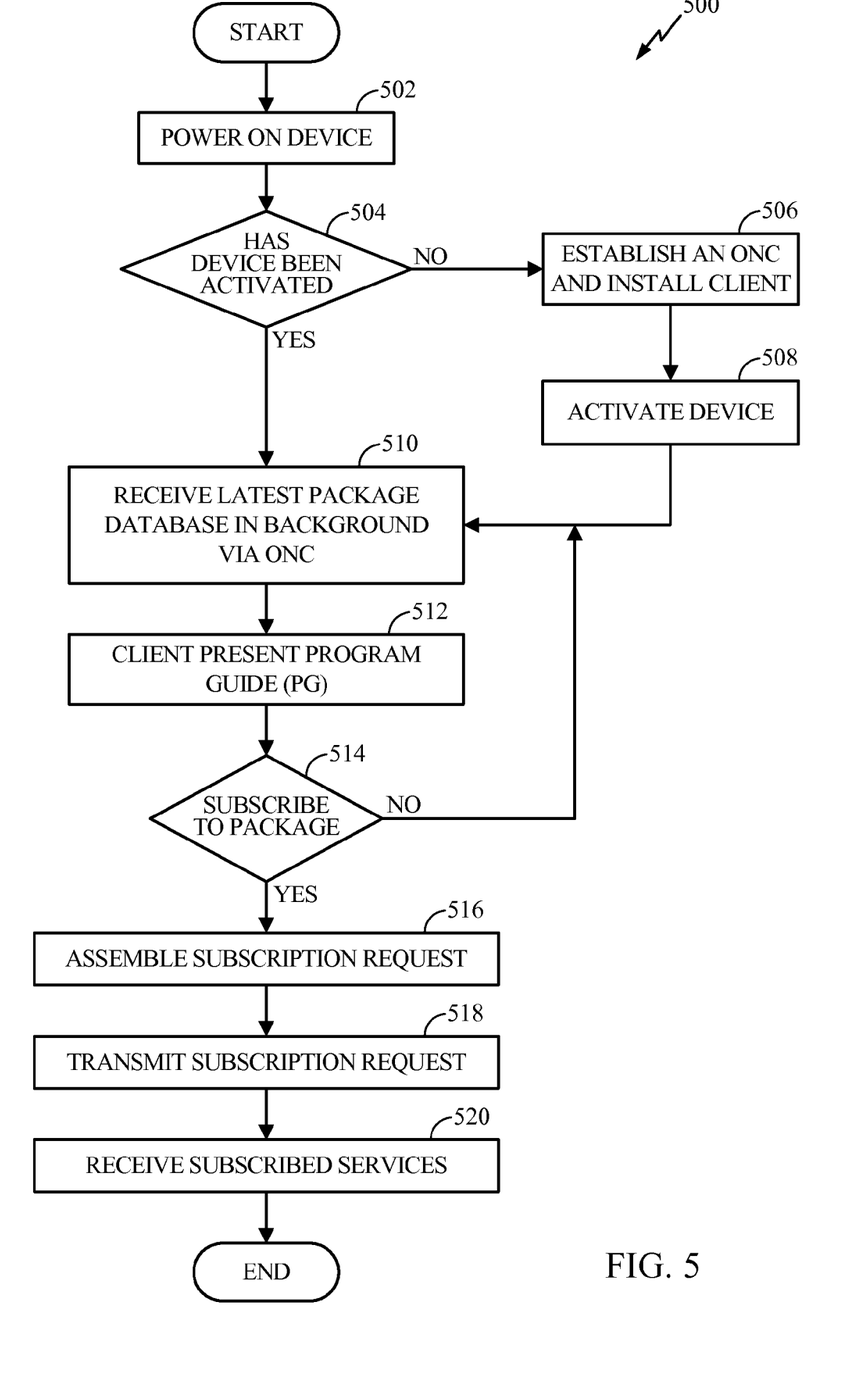
FIG. 5 shows one embodiment of a method for operating a terminal in one or more embodiments of an OTA subscription system.

FIG. 5 shows one embodiment of a method 500 for operating a terminal in one or more embodiments of an OTA subscription system. For clarity, the method 500 will be described with reference to the device 400 shown in FIG. 4. In one or more embodiments, the processing logic 402 executes program instructions to control the device 400 to perform the functions described below.

At block 502, a device user powers on the device. In one embodiment, after powering up, the device operates to establish communication with a data network over a wireless communication link. For example, the processing logic 402 controls the transceiver logic 408 to establish a wireless communication link with the data network.

At block 504, a test is performed to determine if the device has been activated with an OTA subscription system. If the device has been activated with the OTA subscription system, the device actives a client program and the method proceeds to block 510. If the device has not been activated, the method proceeds to block 506.

At block 506, an ONC is established between the device and a content server. For example, in one embodiment, the processing logic 402 communicates with a content server to establish an ONC, which is used to download and install a client program. The client program then executes on the device.

At block 508, the client operates to activate the device with the OTA subscription system. For example, the client program uses the transceiver logic 408 to identify the device to the content server and provide any other activation information that may be required for activation. The method then proceeds to block 510.

At block 510, the client operates to receive the latest package database from the content distribution server. For example the client logic 406 operates to receive the most recent package database in a transparent communication from a content distribution server via the ONC 416. The package database is stored at the device 400 as the package database 412.

At block 512, the client installed on the device operates to display a program guide to the device user. The program guides provides information to the device user about the service packages available for subscription. For example, the information includes scheduling, pricing, availability, and any other relevant information. In one embodiment, the client 406 operates to display information from the package database 412 in the program guide.

At block 514, a test is performed to determine if the user wishes to subscribe to one or more available service packages. For example the user may select one or more service packages from the displayed program guide and request to subscribe to those packages. If the user selects any program packages for subscription, the method proceeds to block 516. If the user does not select any packages for subscription, the method proceeds to block 510, where the device may receive an updated copy of the package database if one is available.

At block 516, the client program operates to assemble a subscription request to allow the device user to subscribe to the selected packages. For example, the subscription request is assembled in accordance with a device-to-service protocol that allows one or more packages to be identified for subscription. For example, in one embodiment, the client logic 406 operates to assemble the subscription request.

At block 518, the completed subscription request is transmitted to a content distribution server. For example, the subscription request may be transmitted to the content distribution server 102 shown in FIG. 1. The subscription request identifies one or more service packages to which the device user wishes to subscribe. In one embodiment, the transceiver logic 408 transmits the subscription request, over-the-air, to the content server using the communication link 414.

At block 520, after the subscription request has been processed by the content server, the subscribed for services are delivered to the device. For example, in one embodiment, the subscribed for services are delivered to the device from the content distribution server via the communication link 414. In another embodiment, the subscribed for services are delivered to give device from a third-party content provider or other content server.

Thus, the method 500 operates to allow a device to subscribe to one or more service packages over-the-air. In another embodiment, the method 500 may be slightly modified to allow the device to unsubscribe or terminate any existing subscriptions. For example, the subscription request may include information that identifies subscriptions to be terminated. It should be noted that the method 500 illustrates just one embodiment and that changes, additions, or rearrangements of the functional elements may be made without deviating from the scope of the described embodiments.

Figure 6:
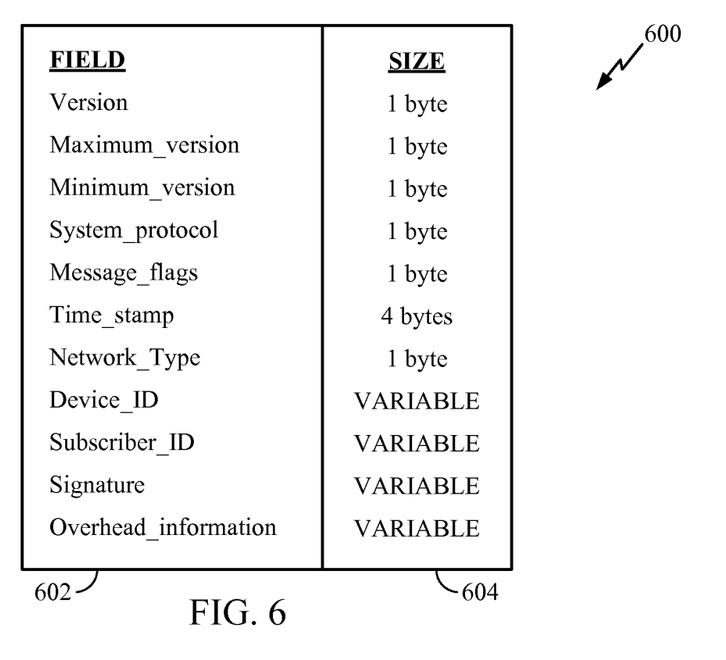
FIG. 6 shows one embodiment of a message layer header for use with a subscription request in one embodiment of an OTA subscription system.

FIG. 6 shows one embodiment of a message layer header 600 for use with a subscription request that is part of a device-to-server protocol in one embodiment of an OTA subscription system. The header 600 comprises information in various data fields 602 that have a specified data size 604. For example, the data field 602 includes a Device_ID, a Subscriber_ID, and a Signature, which all may be used to identify a particular device that originated the request. The header 600 may include virtually any type of data necessary in order to complete a subscription request.

Figure 7:
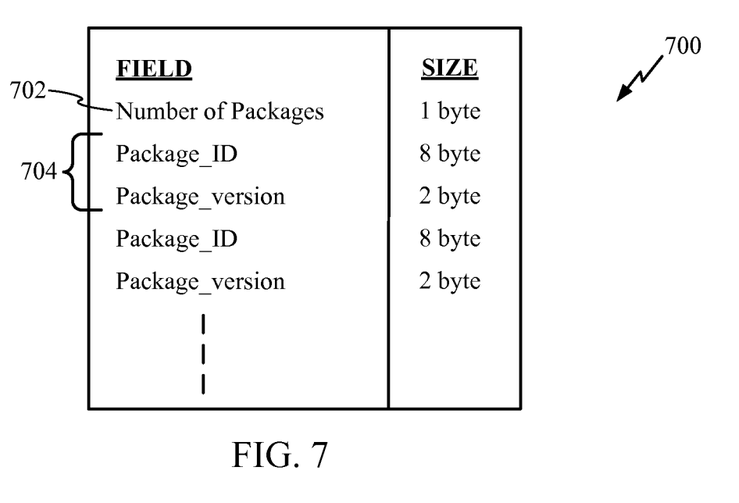
FIG. 7 shows one embodiment of a subscription record for use with a subscription request in one embodiment of an OTA subscription system.

FIG. 7 shows one embodiment of a subscription record 700 for use with a subscription request that is part of a device-to-server protocol in one embodiment of an OTA subscription system. The subscription record 700 identifies a number of packages 702 that comprise Package_ID/Package_version pairs 704 to which the device user wishes to subscribe. For example, each Package_ID is associated with a service packaged offered by a particular service provider. The Package_version refers to the version of the Package as it is cached on the device, which may be used to determine price, description, ratings, and so forth. Thus, the header 600 and subscription record 700 may be used in one or more embodiments of an OTA subscription system to provide a subscription protocol that allows a device to request to subscribe to one or more service packages.

Accordingly, while one or more embodiments of an OTA subscription system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:
1. A method for providing over-the-air subscriptions in a data network, the method comprising:
   transmitting a package database to a device using an overhead notification mechanism, wherein the package database identifies one or more service packages;
   receiving information pertaining to a revision of the package database from the device;
   transmitting an updated package database to the device using the overhead notification mechanism; and
   receiving a request from the device to subscribe to a selected service package.

2. The method of claim 1, further comprising activating the device.

3. The method of claim 1, further comprising determining that the updated package database is not installed on the device.

4. The method of claim 1, further comprising transmitting a client for installation on the device.

5. The method of claim 1, wherein said receiving comprises receiving the request to subscribe to the selected service package using a device-to-server protocol.

6. The method of claim 1, further comprising providing services associated with the selected service package to the device.

7. The method of claim 1, wherein said receiving comprises receiving a request from the device to unsubscribe to a selected service package.

8. Apparatus for providing over-the-air subscriptions in a data network, the apparatus comprising:
   transmitting logic configured to transmit a package database to a device using an overhead notification channel, and configured to transmit an updated package database to the device using the overhead notification channel, wherein the package database identifies one or more service packages; and
   receiving logic configured to receive a request from the device to subscribe to a selected service package, and configured to receive information pertaining to a revision of the package database from the device.

9. The apparatus of claim 8, further comprising processing logic configured to activate the device.

10. The apparatus of claim 9, wherein the processing logic operates to transmit a client for installation on the device.

11. The apparatus of claim 8, wherein the receiving logic further comprises logic configured to receive the request to subscribe to the selected service package using a device-to-server protocol.

12. The apparatus of claim 8, wherein the transmitting logic further comprises logic configured to provide services associated with the selected service package to the device.

13. The apparatus of claim 8, wherein the receiving logic further comprises logic configured to receive the request to unsubscribe to the selected service package.

14. Apparatus for providing over-the-air subscriptions in a data network, the apparatus comprising:
   means for transmitting a package database to a device using an overhead notification mechanism, wherein the package database identifies one or more service packages;
   means for receiving information pertaining to a revision of the package database from the device;
   means for transmitting an updated package database to the device using the overhead notification mechanism; and
   means for receiving a request from the device to subscribe to a selected service package.

15. The apparatus of claim 14, further comprising means for activating the device.

16. The apparatus of claim 14, further comprising means for determining that the updated package database is not installed on the device.

17. The apparatus of claim 14, further comprising means for transmitting a client for installation on the device.

18. The apparatus of claim 14, wherein the means for receiving comprises means for receiving the request to subscribe to the selected service package using a device-to-server protocol.

19. The apparatus of claim 14, further comprising means for providing services associated with the selected service package to the device.

20. The apparatus of claim 14, wherein the means for receiving comprises means for receiving a request to unsubscribe to the selected service package.

21. A computer-readable media comprising means, which when executed by a processor, operate to implement a method for over-the-air subscriptions in a data network, the method comprising:
   transmitting a package database to a device using an overhead notification mechanism, wherein the package database identifies one or more service packages;
   receiving information pertaining to a revision of the package database from the device;
   transmitting an updated package database to the device using the overhead notification mechanism; and
   receiving a request from the device to subscribe to a selected service package.

22. The computer-readable media of claim 21, the method further comprising activating the device.

23. The computer-readable media of claim 21, the method further comprising determining that the updated package database is not installed on the device.

24. The computer-readable media of claim 21, the method further comprising transmitting a client for installation on the device.

25. The computer-readable media of claim 21, wherein the receiving comprises receiving the request to subscribe to the selected service package using a device-to-server protocol.

26. The computer-readable media of claim 21, the method further comprising providing services associated with the selected service package to the device.

27. The computer-readable media of claim 21, wherein the receiving comprises receiving a request to unsubscribe to the selected service package.

28. At least one processor configured to perform a method for providing over-the-air subscriptions in a data network, the method comprising:
   transmitting a package database to a device using an overhead notification mechanism, wherein the package database identifies one or more service packages;
   receiving information pertaining to a revision of the package database from the device;
   transmitting an updated package database to the device using the overhead notification mechanism; and
   receiving a request from the device to subscribe to a selected service package.

29. The at least one processor as defined in claim 28, wherein the method further comprises activating the device.

30. The at least one processor as defined in claim 28, wherein the method further comprises determining that the updated package database is not installed on the device.

31. The at least one processor as defined in claim 28, wherein the method further comprises transmitting a client for installation on the device.

32. The at least one processor as defined in claim 28, wherein said receiving comprises receiving the request to subscribe to the selected service package using a device-to-server protocol.

33. The at least one processor as defined in claim 28, wherein the method further comprises providing services associated with the selected service package to the device.

34. The at least one processor as defined in claim 28, wherein said receiving comprises receiving a request from the device to unsubscribe to a selected service package.

* * * * *